(12) United States Patent
Chen

(10) Patent No.: US 6,279,717 B1
(45) Date of Patent: Aug. 28, 2001

(54) CONVEYOR FRAME

(76) Inventor: Nick Chen, No. 64-2, Chiu Sheh Lane, Chiu Sheh, Pei Tun Area, Taichung (TW)

( * ) Notice: Subject to any disclaimer, the term of this patent is extended or adjusted under 35 U.S.C. 154(b) by 0 days.

(21) Appl. No.: 09/551,555

(22) Filed: Apr. 18, 2000

(51) Int. Cl.[7] .................................................. B65G 13/00
(52) U.S. Cl. .............................. 193/35 MD; 193/35 MD; 193/37; 193/36; 193/42
(58) Field of Search ............................... 198/615; 193/37, 193/35 MD, 42, 36

(56) References Cited

U.S. PATENT DOCUMENTS

| | | | |
|---|---|---|---|
| 5,299,656 | * | 4/1994 | Grill ................................... 182/186.4 |
| 5,337,875 | * | 8/1994 | Lee ...................................... 193/35 R |
| 5,404,984 | * | 4/1995 | Hagman .......................... 193/35 MD |
| 5,487,445 | * | 1/1996 | Biehl .................................... 182/181 |
| 5,657,857 | * | 8/1997 | Neilson et al. .................... 198/861.1 |
| 5,730,579 | * | 3/1998 | Keck et al. ........................ 414/791.6 |
| 6,019,211 | * | 2/2000 | Masciarelli, Jr. ................. 198/345.1 |
| 6,179,024 | * | 1/2001 | Yang ................................... 144/287 |

* cited by examiner

Primary Examiner—Christopher P. Ellis
Assistant Examiner—Jeffrey A. Shapiro
(74) Attorney, Agent, or Firm—Browdy and Neimark

(57) ABSTRACT

A conveyor frame comprises a support frame, a rolling shaft, and a ball frame. The support frame is provided at both ends of the longitudinal axis thereof with a folded plate which is provided with a locating hole. The folded plates are provided with an annular protrusion. The rolling shaft is pivoted between the two locating holes of the folded plates. The ball frame has a long body which is provided in one side thereof with a plurality of balls and at both ends thereof with a long cover plate. The long cover plate is provided with a long hole extending along the direction of the longitudinal axis thereof. The long body is further provided at both ends thereof with a shoulder of a predetermined length and extending along the longitudinal side of the cover plate. The ball frame is disposed between the two folded plates such that the two cover plates are disposed in the outer sides of the folded plates, and that the folded plates are disposed on the two shoulders of the cover plates, and further that the annular protrusions of the folded plates are received in the long holes of the cover plates.

6 Claims, 3 Drawing Sheets

CONVEYOR FRAME

FIELD OF THE INVENTION

The present invention relates generally to a conveyor, and more particularly to a conveyor frame.

BACKGROUND OF THE INVENTION

Generally speaking, the conveyor frame is of a rolling shaft type or ball type. The conveyor frame of the rolling shaft type provides the one-dimensional and linear motion; nevertheless it is capable of providing an article with a wider support area. The conveyor frame of the ball type is capable of providing the rolling motion in various directions as well as the multi-dimensional planar motion. However, the ball-type conveyor frame provides the article with a point contact support. As far as these two types of the conveyor frames are concerned, they have advantages and disadvantages.

The Taiwan Utility Patent No. 81202836 discloses a conveyor frame having a support which is provided with a rolling shaft conveying structure and a ball conveying structure. The operator may choose to use either the rolling shaft conveying structure or the ball conveying structure, depending on the need of the operation. The disclosure has a rotary platform on which a rolling shaft conveying structure and a ball conveying structure are pivotally mounted. The rotary platform is pivoted to a cross seat by two side pieces which are provided in the inner walls thereof with a confining block corresponding to the inside of the cross seat. The rotary platform turns on the pivoting point such that the confining block presses against the top of the cross seat, and that the rotary platform is capable of a 90-degree rotation. This structure is defective in design in that the rotary platform is located by the confining block, and that the rotary platform is apt to sway when a cumbersome article is being conveyed.

SUMMARY OF THE INVENTION

The primary objective of the present invention is to provide a conveyor frame with the rolling shaft conveying structure and the ball-type conveying structure, which are free from the drawbacks of the prior art conveyor frame described above.

In keeping with the principle of the present invention, the foregoing objective of the present invention is attained by a conveyor frame comprising a support frame, a round rolling shaft, and a ball frame. The support frame is provided at both ends of a longitudinal axis thereof with a folded plate which is provided with a locating hole. These two folded plates are provided with an annular protrusion. The round rolling shaft is pivoted between the two locating holes of the folded plates. The ball frame has a long body which is provided in one side thereof with a plurality of balls and at both ends thereof with a long cover plate. The long cover plate is provided with a long hole extending along the direction of the longitudinal axis thereof. The long body is further provided at both ends thereof with a shoulder of a predetermined length and extending along the longitudinal side of the cover plate. The ball frame is disposed between the two folded plates such that the two cover plates are disposed in the outer sides of the folded plates, and that the folded plates are disposed on the two shoulders of the cover plates, and further that the annular protrusions of the folded plates are received in the long holes of the cover plates.

DETAILED DESCRIPTION OF THE INVENTION

Figure 1:
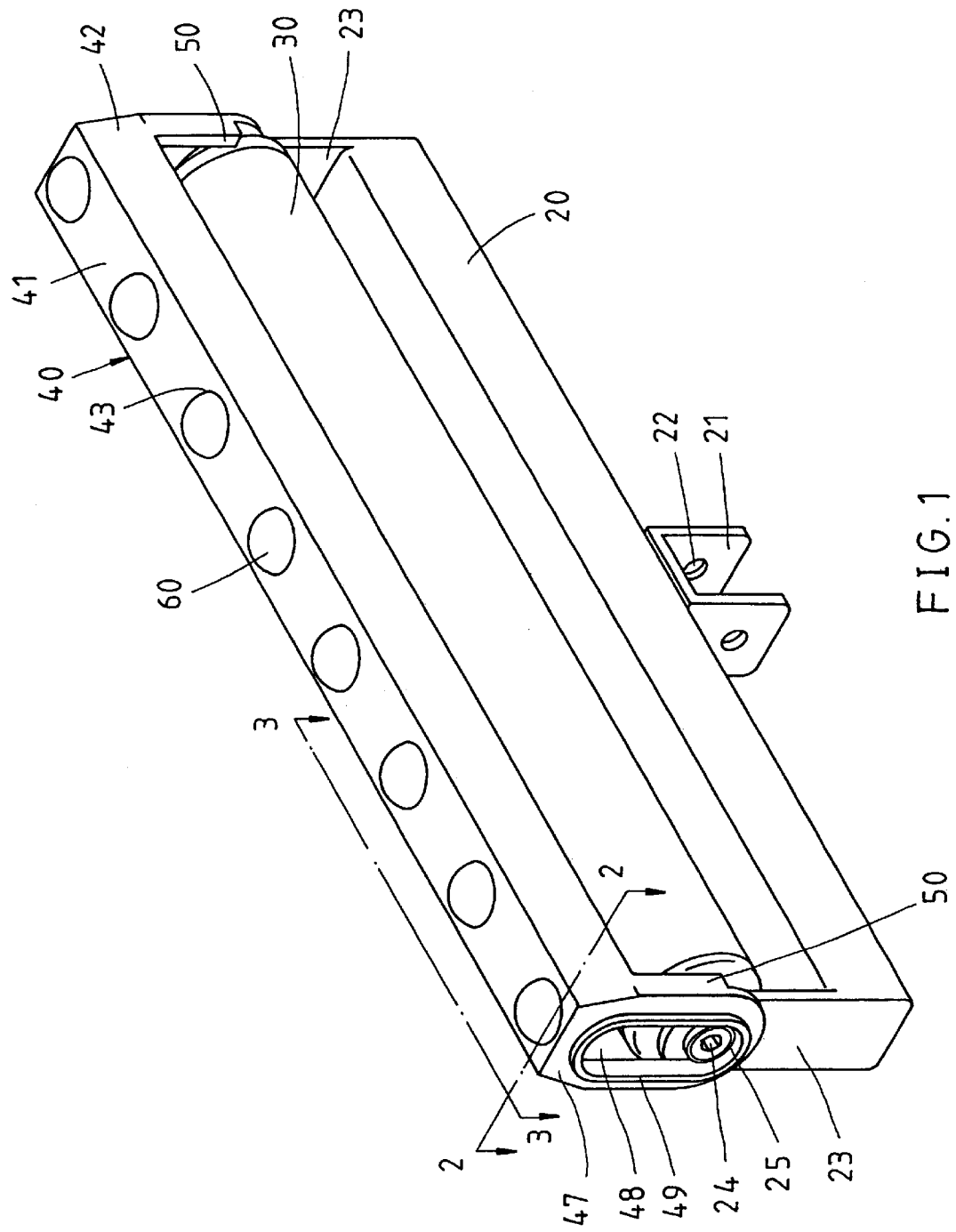
FIG. 1 shows a perspective view of a preferred embodiment of the present invention.
Figure 2:
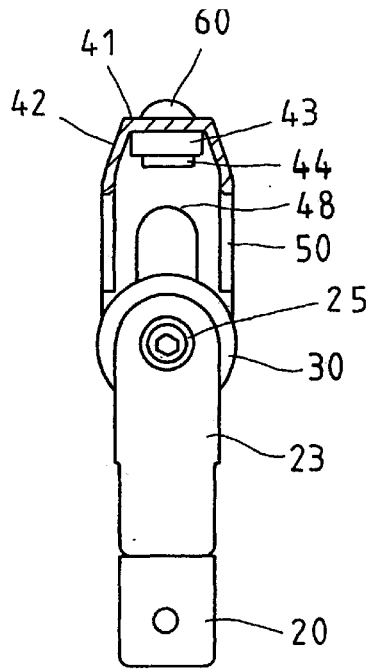
FIG. 2 shows a sectional view taken along the direction indicated by a line 2—2 as shown in FIG. 1.

As shown in FIGS. 1 and 2, a conveyor frame embodied in the present invention comprises a support frame 20, a rolling shaft 30, a ball frame 40, and a plurality of balls 60.

The support frame 20 is made of a metal tube having a square cross section and is provided in the midsegment of one side thereof with a connection portion 21 which is formed of two metal plates, with each having a through hole 22. The support frame 20 is provided at both ends of a longitudinal axis thereof with a folded plate 23 which is provided with a locating hole 24. The two locating holes 24 are coaxial. The folded plates 23 are provided with an annular protrusion 25.

The rolling shaft 30 is made of a metal or plastic material and is of a cylindrical construction. The rolling shaft 30 is pivoted between the two locating holes 24 of the two folded plates 23.

The ball frame 40 is made of a plastic material and is provided on a long body thereof with a top portion 41. The ball frame 40 is further provided in two longitudinal sides thereof with a curved side portion 42. The top portion 41 is provided with a plurality of cavities 43, which are arranged at a predetermined interval and are provided in the bottom wall thereof with a recess 44. The bottom wall of the cavities 43 and the connection portion of the recess 44 form an annular shoulder surface 45. The recess 44 is provided with a through hole 46 via which the dust is let out, thereby preventing the dust from being accumulated in the cavity 43. The long body is provided at both ends of a longitudinal axis thereof with a long cover plate 47 which is provided with a long hole 48 extending along the longitudinal direction thereof. The two cover plates 47 are provided with a protruded edge 49. Each side portion of the long body is provided at both ends thereof with a shoulder 50 extending along the long side of the cover plate. The bottom of the shoulder is separated from the top portion by a predetermined distance. The ball frame is mounted on the two folded plates 23 such that the cover plates 47 are disposed in the outer sides of the two folded plates, and that each folded plate 23 is held between the two shoulders 50, and further that the annular protrusion 25 of the folded plate is received in the long hole 48 of the cover plate.

The balls 60 are disposed in the cavities 43. The balls 60 have a maximum diameter slightly greater than the diameter of the opening of each cavity. The balls are forced into the cavities in which the balls are retained securely. The distance between the opening of the cavity and the bottom of the cavity is smaller than the maximum diameter of the ball, thereby enabling each ball to be partially exposed such that the ball turns freely in the cavity. The diameter of the opening of the recess 44 is smaller than the diameter of the opening of the cavity, thereby enabling the ball to be in contact with the annular shoulder without falling into the recess. The top of the ball is exposed, with the remaining portion of the ball being contained by the cavity 43 and the recess 44.

Figure 5:
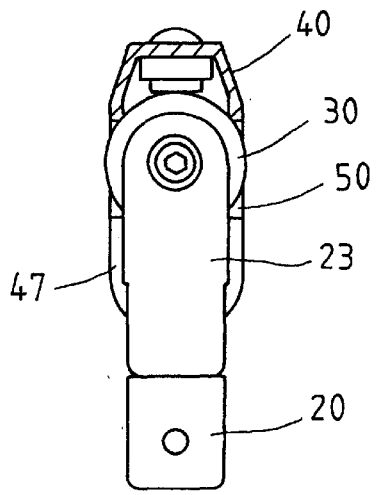
FIG. 5 shows another sectional schematic view of the present invention in use.

As shown in FIG. 5, the conveyor frame of the ball type of the present invention is in use such that the ball frame 40 is disposed on the rolling shaft 30, and that the two cover plates 47 cover the outer sides of the two folded plates 23, and further that the two shoulders 50 of the cover plate are held on two sides of the corresponding folded plate, and further that the annular protrusions 25 of the two folded plates are rested on the top of the long hole, so as to fix the ball frame securely on the support frame 20 and the rolling shaft 30.

Figure 4:
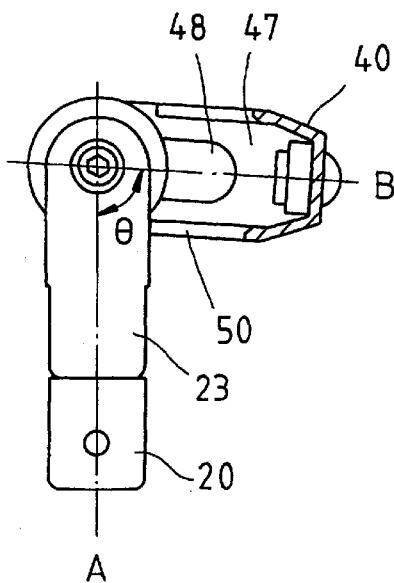
FIG. 4 shows a sectional schematic view of the present invention in operation.
Figure 3:
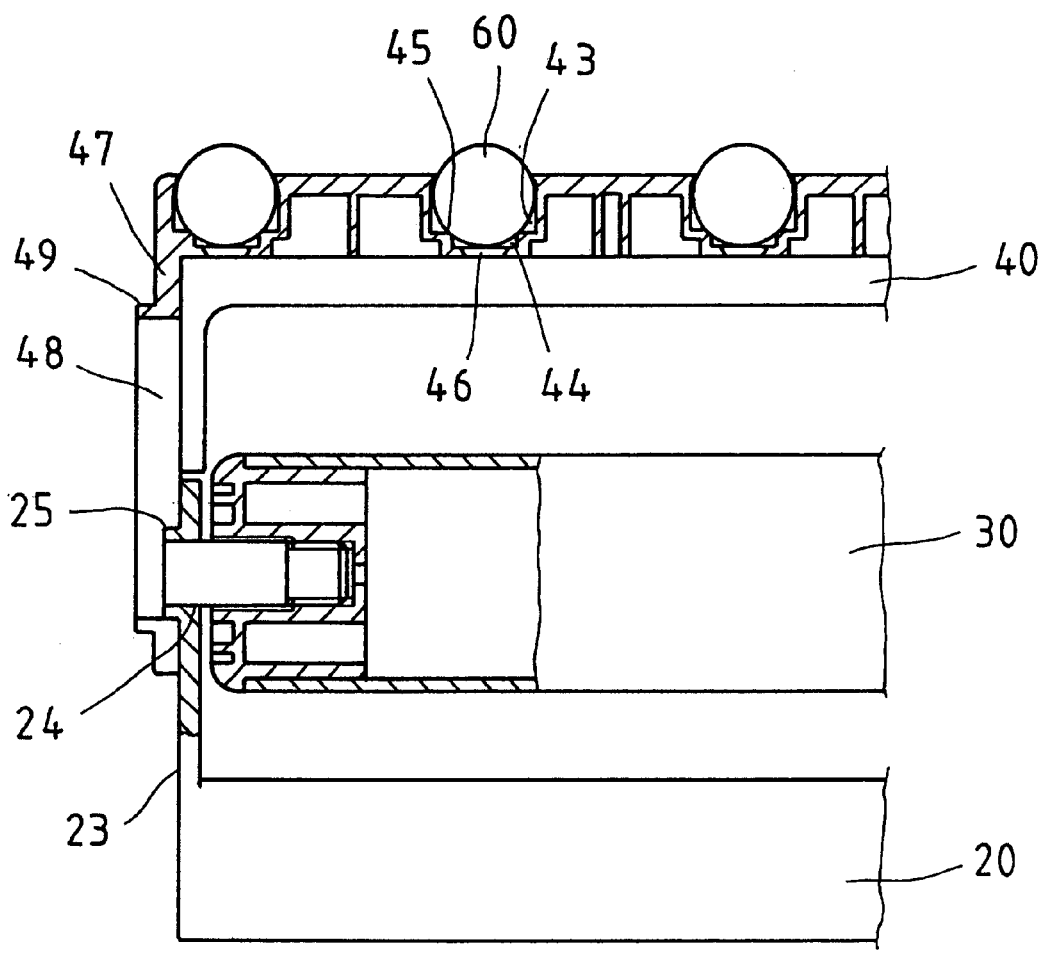
FIG. 3 shows a sectional view taken along the direction indicated by a line 3—3 as shown in FIG. 1.

As shown in FIGS. 3 and 4, the conveyor frame of the rolling shaft is in use. Before the use of the conveyor frame, the ball frame is first lifted without slipping completely out of the support frame by virtue of the annular protrusions of the folded plates being retained in the long hole 48. When the ball frame is lifted to the top point, the annular protrusions are retained at the bottom of the long hole such that the ball frame can be turned leftward or rightward on the annular protrusions acting as axes.

As illustrated in FIG. 4, when the ball frame 40 is turned rightward, the bottom of the right shoulder 50 of the cover plate 47 presses against the right side of the folded plate 23 such that an acute angle $\theta$ is formed by the imaginary longitudinal middle line A of the support frame and the imaginary longitudinal middle line B of the ball frame. As a result, the rolling shaft 30 is jutted out of the ball frame 40. The rolling shaft 30 can be thus put to work without being interfered with by the ball frame 40.

What is claimed is:

1. A conveyor frame comprising:

a support frame having a long main body and two folded pieces disposed in two sides of a longitudinal axis of said long main body, said two folded plates being provided coaxially with a locating hole whereby said locating hole is provided in a hole edge thereof with an annular protrusion;

a round rolling shaft pivoted between said two locating holes of said two folded plates;

a ball frame having a long body and two long cover plates extending vertically from two sides of said long body, said cover plates provided with a long hole and a shoulder of a predetermined length and extending toward another cover plate from a junction of the long side and the body, said ball frame being mounted between said two folded plates such that two annular protrusions of said support frame are extended into said long holes, and that said ball frame can be displaced along a longitudinal axis of said long holes, and further that said ball frame is turned leftward and rightward on said annular protrusions acting as axes at such time when one end of the longitudinal axis of said long hole presses against said annular protrusions, and further that said ball frame is located at such time when other end of the longitudinal axis of said long hole presses against said annular protrusion such that the shoulders of said cover plates are located on two sides of said folded plates of said support frame; and a plurality of balls whereby said balls are arranged at a predetermined interval on one side of said long body of said ball frame.

2. The conveyor frame as defined in claim 1, wherein said folded plates of said support frame comprise an imaginary longitudinal middle line; wherein said cover plates of said ball frame comprise an imaginary longitudinal middle line which forms with the imaginary longitudinal middle line of said folded plates of said support frame an acute angle.

3. The conveyor frame as defined in claim 1, wherein said long body of said ball frame has a top portion and two curved side portions extending from two long sides thereof, said top portion provided with a plurality of cavities, said cavities being arranged at a predetermined interval for receiving said balls whereby said balls are rotatably received in said cavities such that said balls are partially jutted out of said top portion.

4. The conveyor frame as defined in claim 3, wherein said cavities have an opening with a diameter smaller than a maximum diameter of said balls.

5. The conveyor frame as defined in claim 4, wherein said cavities are provided in a bottom wall thereof with a recess, said recess having an opening smaller in diameter than said opening of said cavities; wherein said maximum diameter of said balls is greater than a distance between said opening and said bottom wall of said cavities.

6. The conveyor frame as defined in claim 5, wherein said recess is provided with a through hole.

* * * * *